Oct. 31, 1939.　　　L. A. SPIEVAK　　　2,178,379
MEANS FOR PHOTOGRAPHIC TYPE COMPOSING
Filed Dec. 16, 1935　　　9 Sheets-Sheet 2

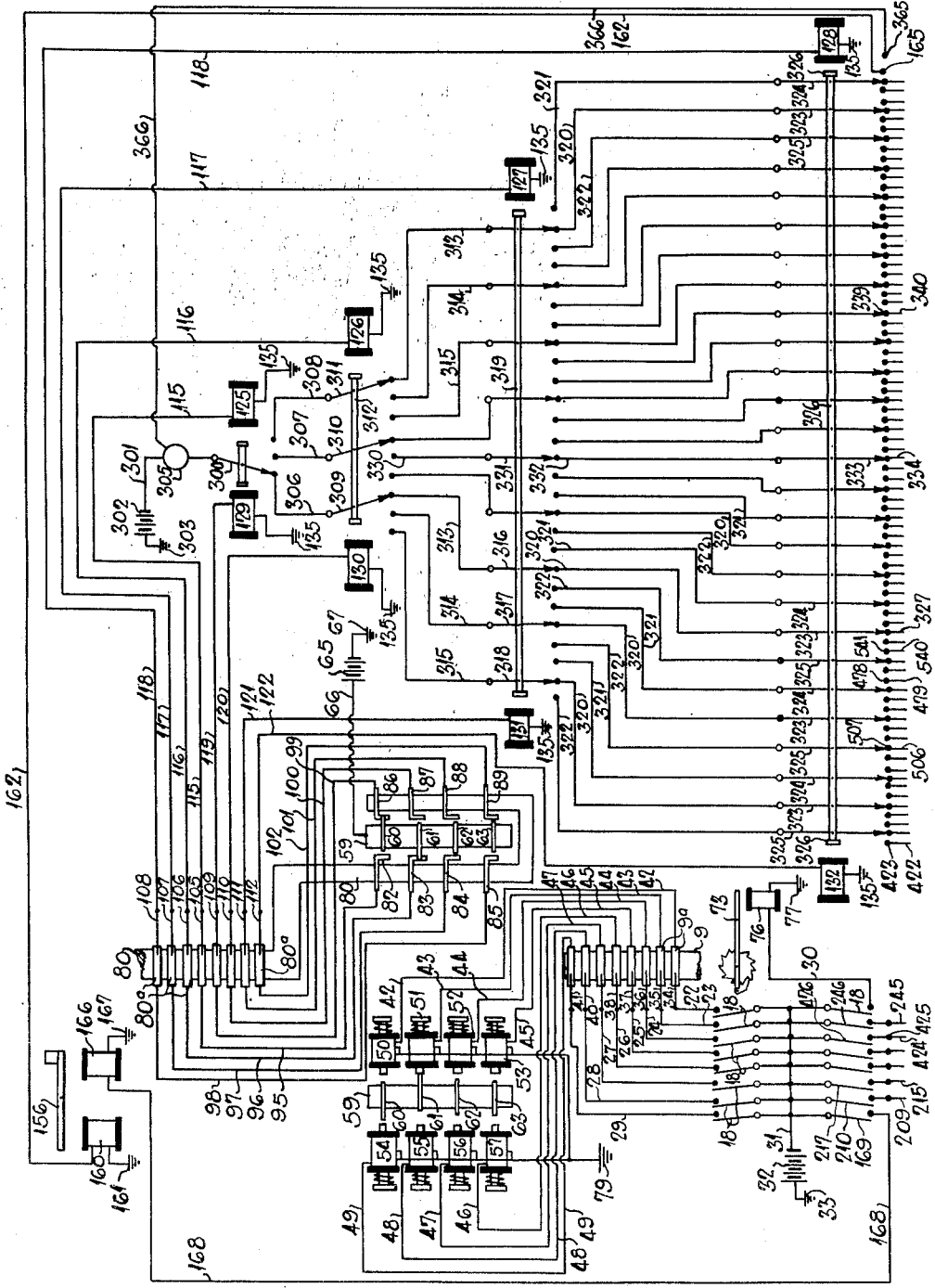

Inventor:
LOUIS A. SPIEVAK
By Paul B. Eston
Attorney

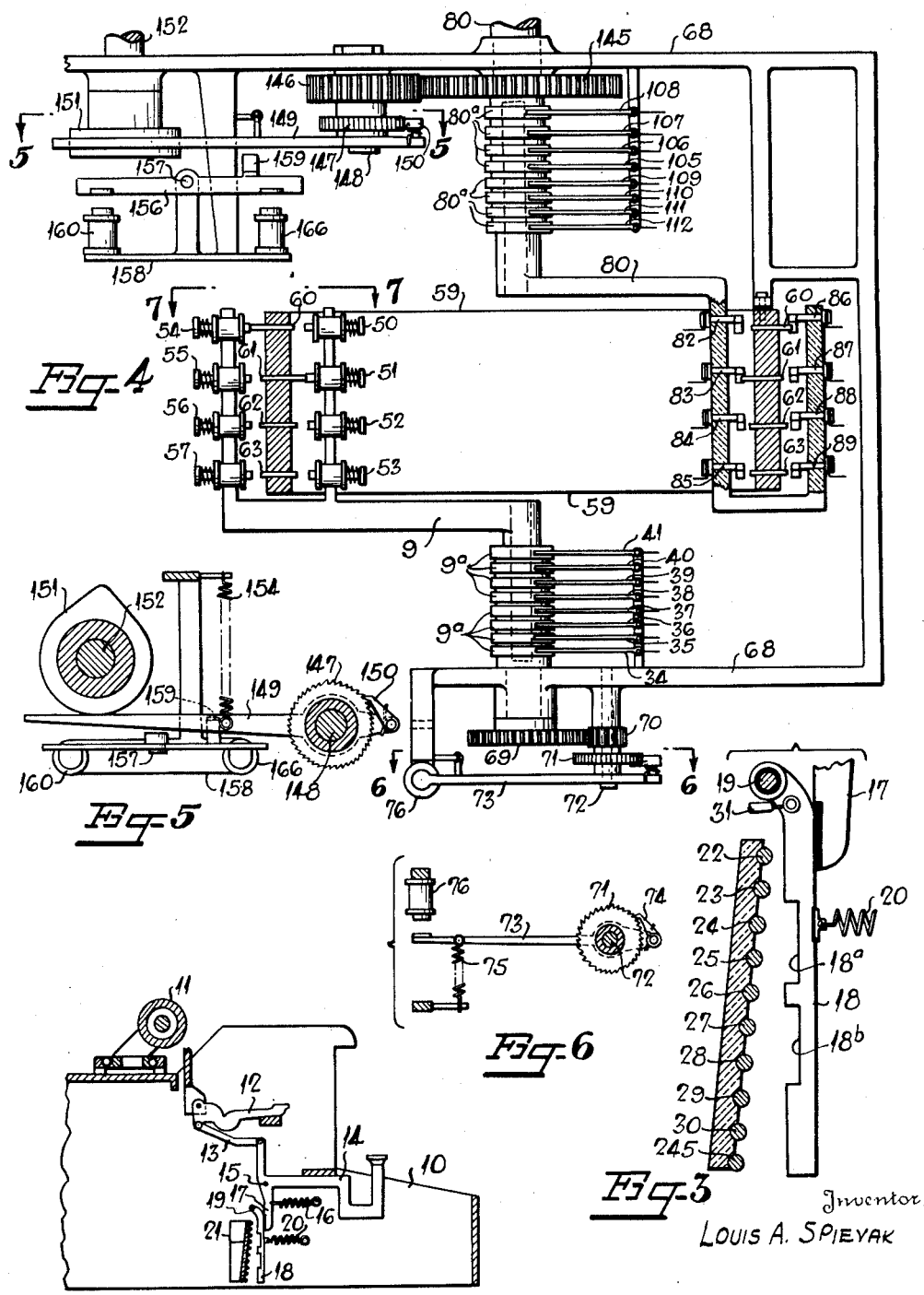

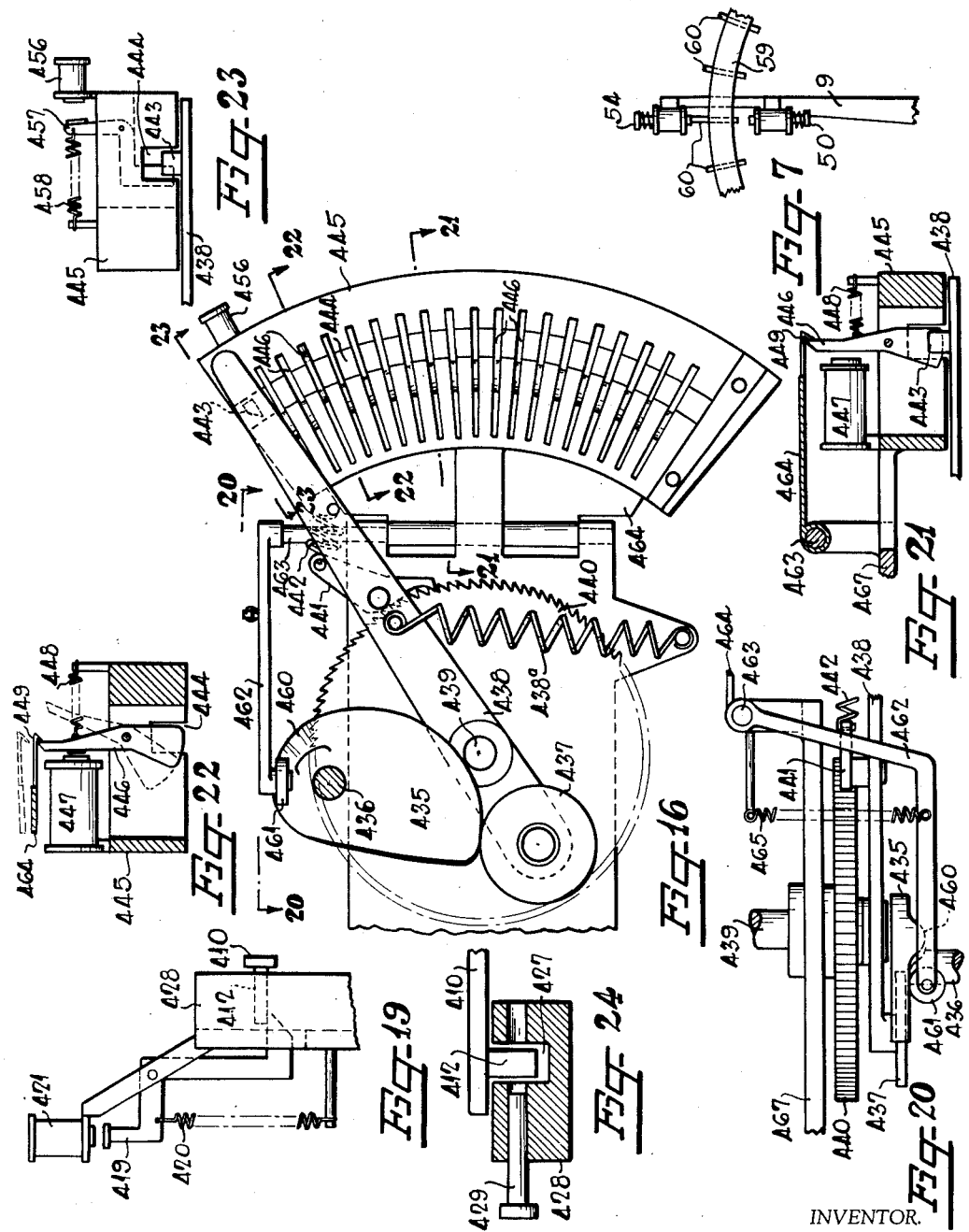

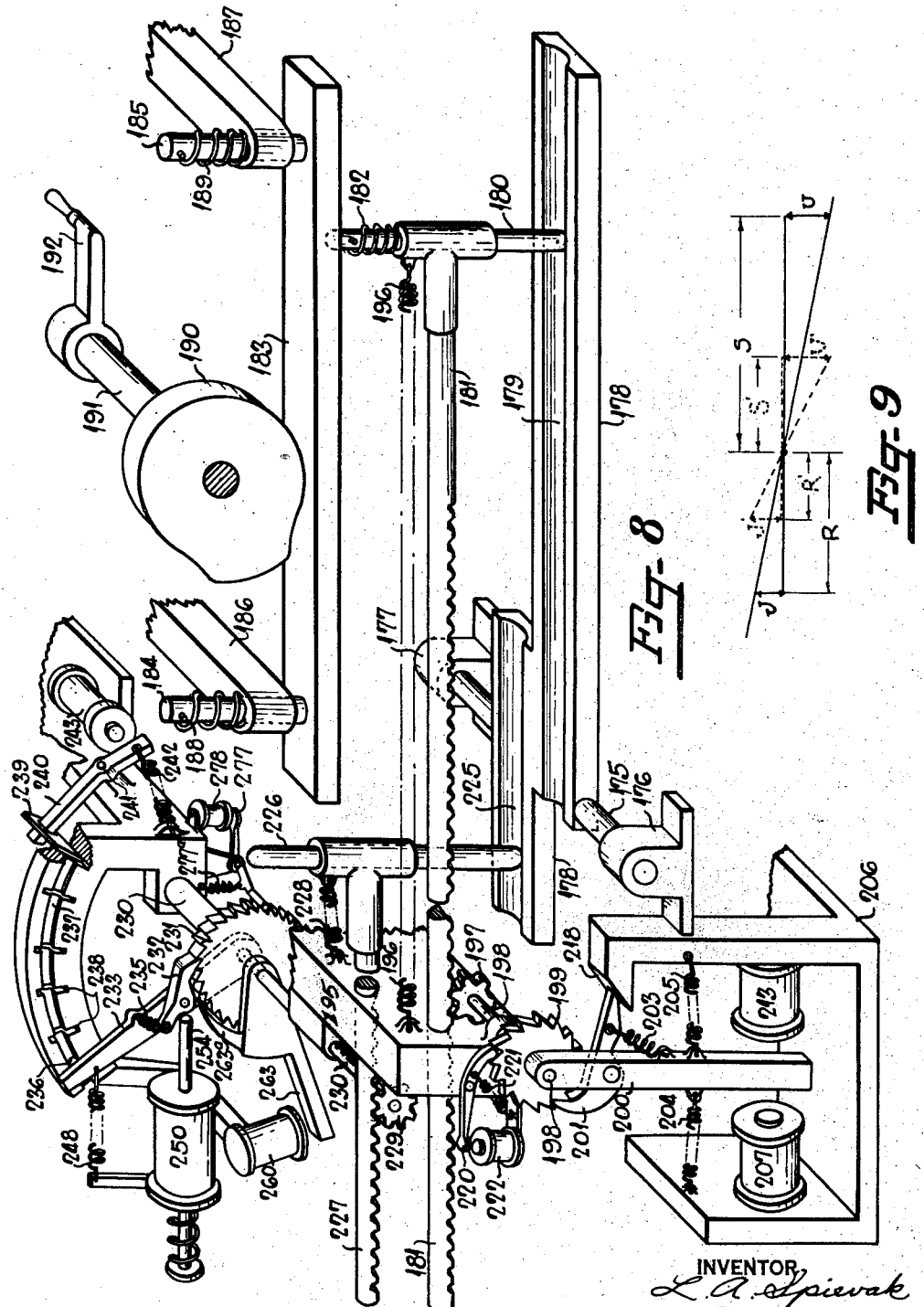

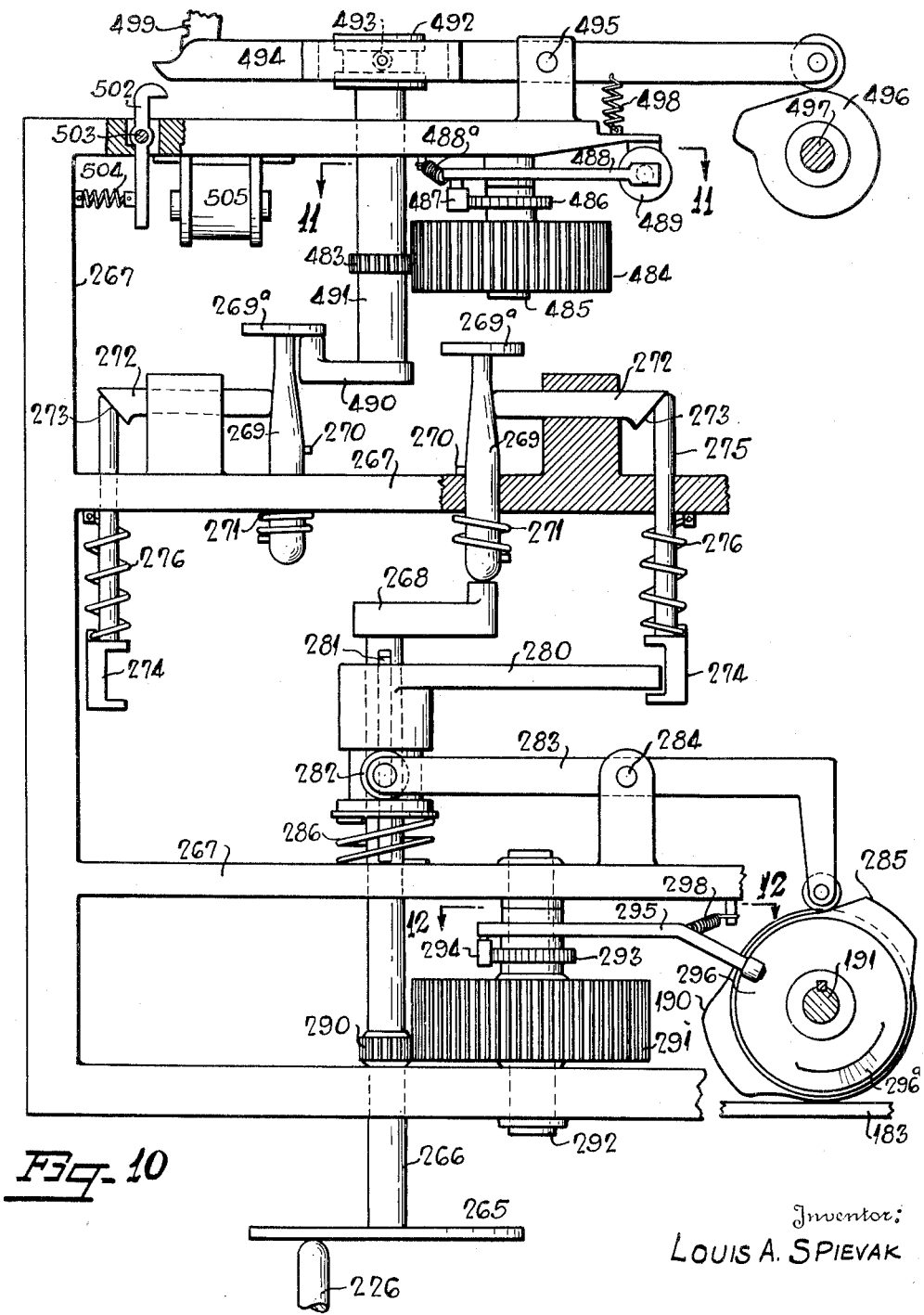

Inventor:
LOUIS A. SPIEVAK

Oct. 31, 1939.                    L. A. SPIEVAK                    2,178,379
                    MEANS FOR PHOTOGRAPHIC TYPE COMPOSING
              Filed Dec. 16, 1935         9 Sheets-Sheet 8
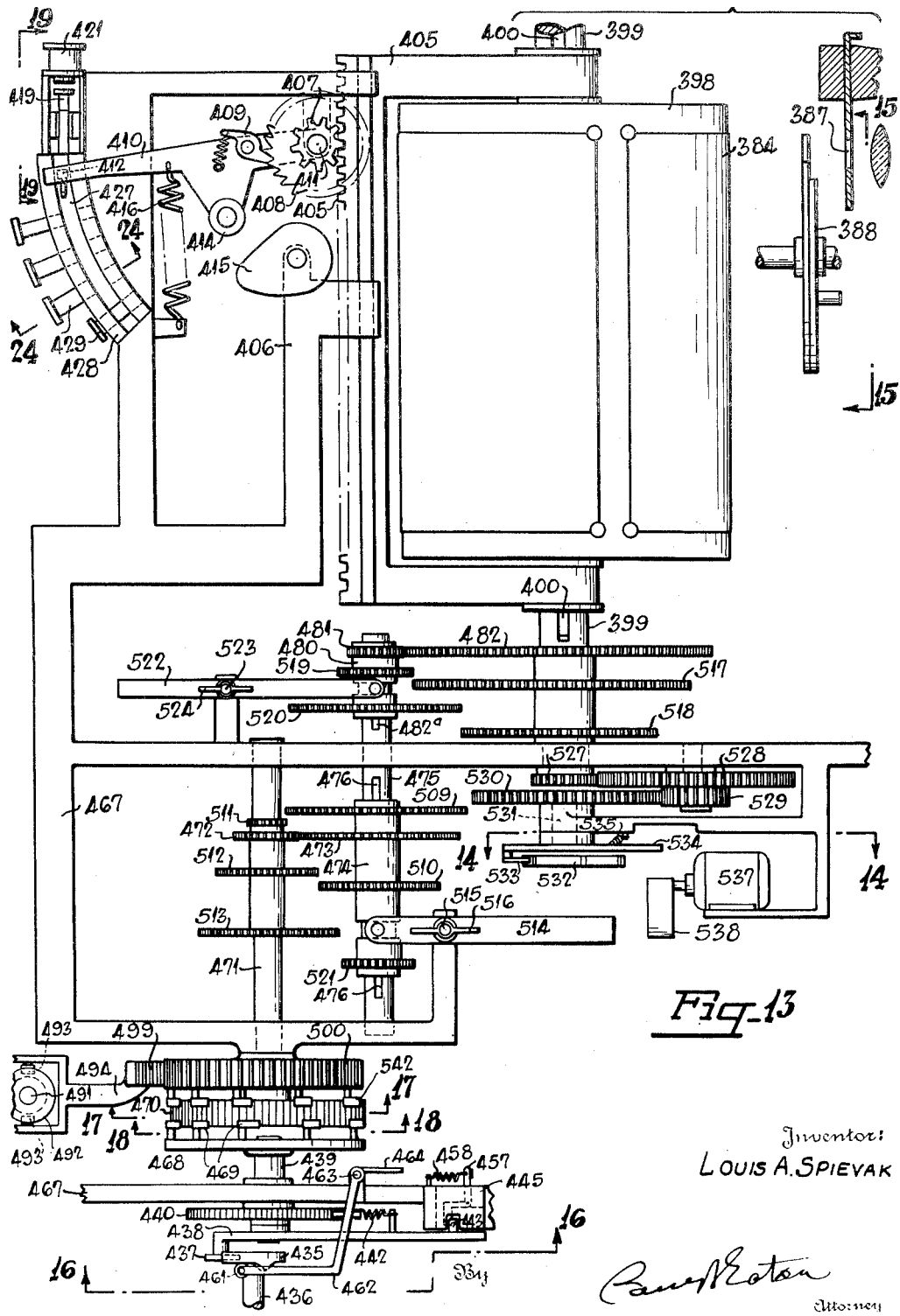
Inventor:
LOUIS A. SPIEVAK Oct. 31, 1939.  L. A. SPIEVAK  2,178,379
MEANS FOR PHOTOGRAPHIC TYPE COMPOSING
Filed Dec. 16, 1935   9 Sheets-Sheet 9
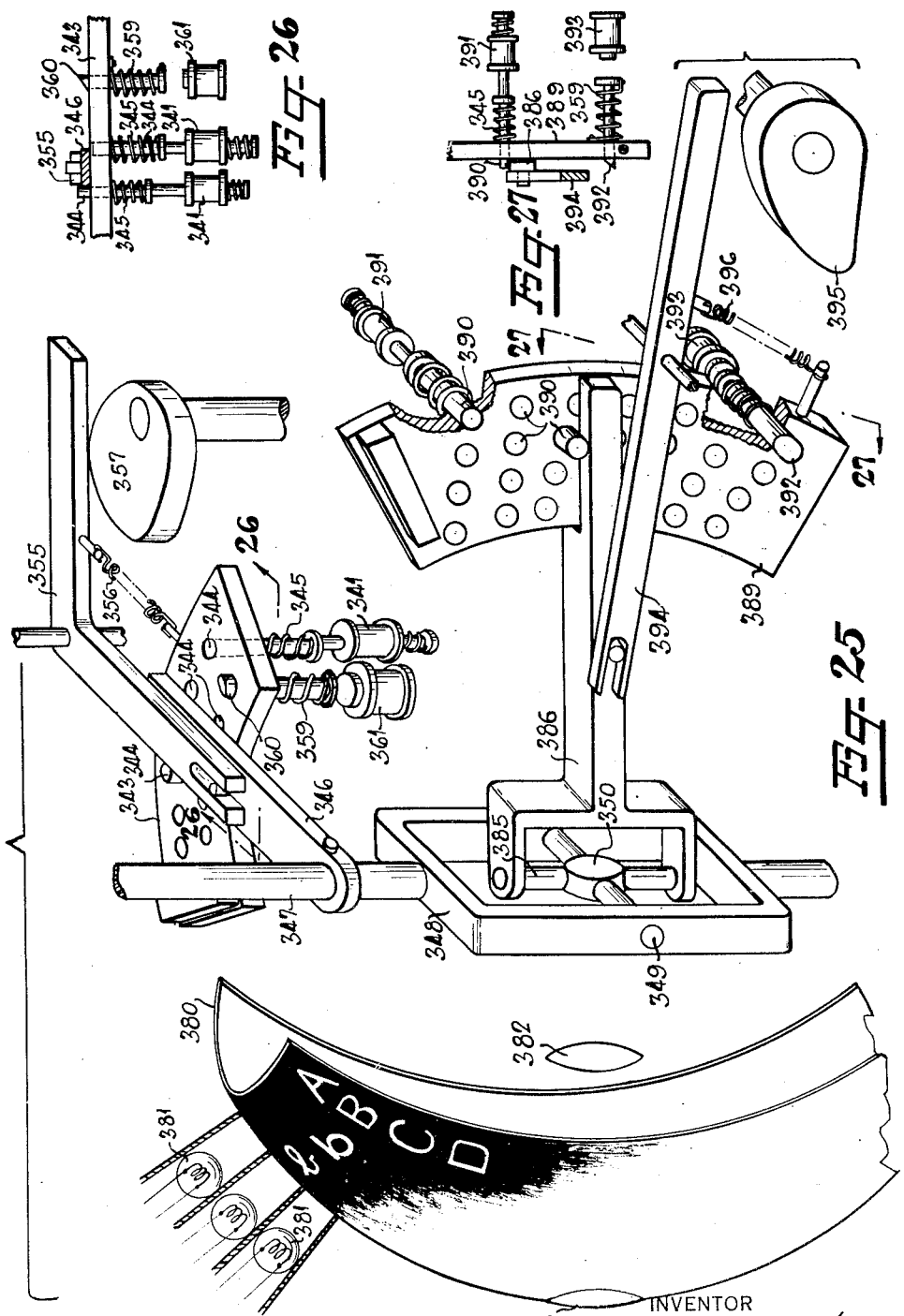

Patented Oct. 31, 1939

2,178,379

UNITED STATES PATENT OFFICE 2,178,379

MEANS FOR PHOTOGRAPHIC TYPE COMPOSING

Louis A. Spievak, Atlanta, Ga.

Application December 16, 1935, Serial No. 54,706

42 Claims. (Cl. 95—4.5)

This invention relates to means for producing photographic type matter composition used in ordinary lithographic or rotogravure or other purposes for which sensitized films or plates may be used. More specifically, it relates to a photographic apparatus operated by an ordinary typewriter with electrical connections between said typewriter and a selector mechanism which in turn operates means for selecting independent characters and photographing the same upon a suitable film or plate. When the matter is typed, impulses are set up by the selecting mechanism to be used for controlling the operations of the various mechanisms for producing this result. When a code is set up on the selector mechanism it remains untouched for the remainder of the line at which time, ordinarily, a de-coding mechanism is thrown into action which will transfer these representations to a distribution point. When this is done the value will control the angular displacement of a suitable mirror system which reflects the projection of the image of a character upon a film for photographing the same.

It is an object of this invention to provide a justifying coding system whereby one or more lines can be set up in code and an independent justification for each line also set up in code to be used with their proper line. This makes it possible to operate the coding system practically continuously since a stationary code system is used with independent coding and de-coding systems.

Means are also provided whereby the coding system can be operated intermittently at the will of the operator whereas the de-coding system operates at a uniform speed. If the decoding system were operated at the same variable speed as that of the operator it would be necessary to limit the time of exposure in the projecting machine to the fastest speed of the operator, but since the decoding system works independently at a constant speed which is approximately equivalent to the average speed of the operator, it is possible to use an exposing time greater than the time intervals occurring between operation of the keys of the typewriter.

It is another object of the invention to provide means for holding a sensitized film on a cylindrical platen and rotating the platen a definite space for each character to appear thereon, and providing means for projecting the image of one character at a time onto said film, and when a line of characters has been placed on said film to complete rotation of the platen to a complete turn and moving the platen longitudinally of its axis of rotation to step the film to new line position.

It is another object of the invention to provide a typewriter having conventional type bars and key bars for writing lines of type characters, and each time a key bar is actuated a plurality of impulses are transmitted to a selector where selections are made for a line or more, measuring the space the written characters will occupy in regular line printing and also transmitting impulses to make a setting in the selector each time the space bar is operated in the typewriter, providing means for counting the times the space bar is actuated and moving a member a predetermined amount each time the space bar is actuated, then mechanically making a calculation to divide the space remaining in a line to justify the same by the word spaces in the line, providing means for reading a line of selections after a line has been set, providing a member having representations of the characters in the typewriter, providing a mirror and causing relative movement between the member having the characters thereon and the mirror to project the selected image onto a sensitized film, and moving the film in accordance with the width of the character and also moving the film to space the words an equal distance apart on the film in accordance with the justifying means.

It is another object of the invention to provide means for making a film having lines of justified type characters thereon by storing selections in a selector, measuring the space the characters selected will occupy in regular line printing, also counting the spaces between the words in a line and then performing a calculating operation to divide the space remaining to make a filled line by the number of word spaces and setting a mechanism and locking the said mechanism in position, and providing means for reading a line of selections while a new line of selections are being set and providing a member having representations of the characters and controlling the movements of a reflecting medium or refracting medium to cast the image of the selected character onto the film, the relative movement between the reflecting or refracting medium being controlled by the reading of the settings in the selector and the member set for justification moving the film an additional amount over the amount a space selection will move it so that a plate or film can be produced having perfectly justified lines of type characters, which plate or film can be used for direct printing or plates can be prepared therefrom for printing.

It is another object of the invention to provide means for justifying a line of characters by dividing the unused space in a line by the number of word spaces in the line and positioning the words an equal distance apart in the line.

Some of the objects of the invention having been stated, other objects will appear as the description proceeds when taken in connection with the accompanying drawings, in which—

Figure 1 is a schematic wiring diagram of a portion of the invention;

Figure 2 is a sectional view through an ordinary typewriter showing the means for connecting the coding apparatus thereto;

Figure 3 is an enlarged sectional detail view of the lower central portion of Figure 2;

Figure 4 is a vertical sectional view through the coding and de-coding means;

Figure 5 is a sectional plan view taken along the line 5—5 in Figure 4;

Figure 6 is a sectional plan view taken along line 6—6 in Figure 4;

Figure 7 is a detail plan view taken along line 7—7 in Figure 4;

Figure 8 is a perspective view showing the justifier;

Figure 9 is a graphical representation of the geometrical principle used in the justifier;

Figure 10 is an elevation with certain portions thereof in section showing the justification coding and decoding means;

Figure 13 is an elevation showing certain portions thereof in section of the film carriage and its controls;

Figure 16 is an elevation of the limiting device to determine the movement of the film carriage for ordinary spacing and taken along the line 16—16 in Figure 13;

Figure 19 is a sectional view taken along the line 19—19 in Figure 13;

Figure 20 is a view taken along line 20—20 in Figure 16;

Figure 21 is a sectional view taken along the line 21—21 in Figure 16;

Figure 22 is a sectional view taken along line 22—22 in Figure 16;

Figure 23 is a sectional view taken along line 23—23 in Figure 16;

Figure 24 is a sectional view taken along line 24—24 in Figure 13 showing the limiting device;

Figure 25 is a perspective view of the projection unit;

Figure 26 is a sectional view taken along line 26—26 in Figure 25;

Figure 27 is a sectional view taken along line 27—27 in Figure 25;

Figure 1A:
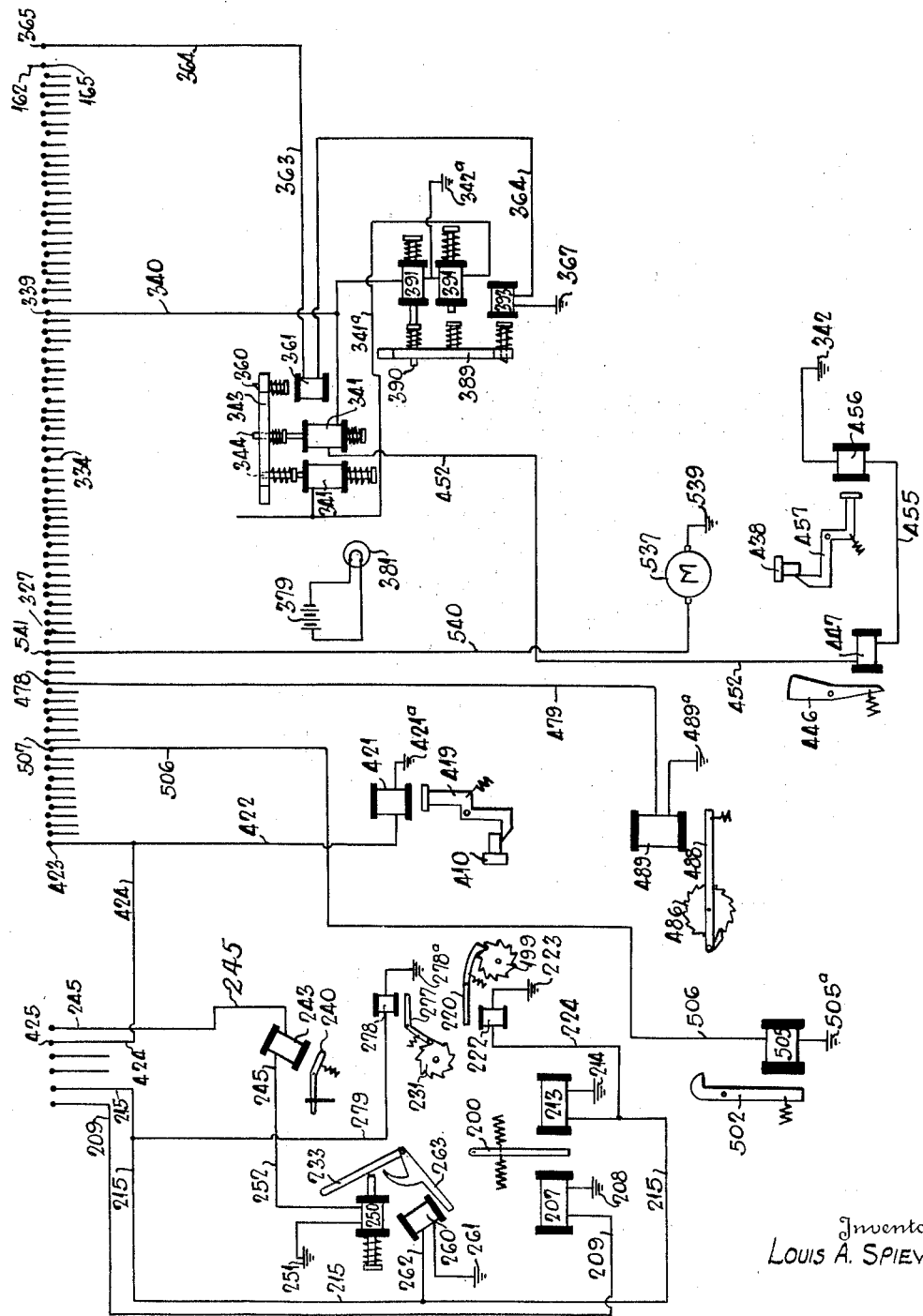
Figure 1A is a schematic wiring diagram of the other portions of the invention which are adapted to cooperate with the parts shown in Figure 1.
Figure 17:
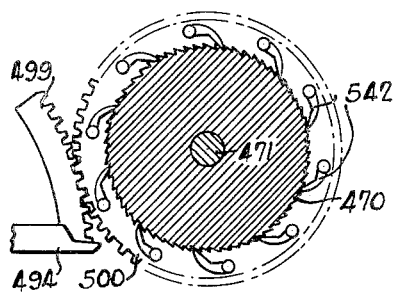
Figure 17 is a sectional view taken along the line 17—17 in Figure 13 showing the ratcheting mechanism for advancing the film platen to effect the justification.
Figure 15:
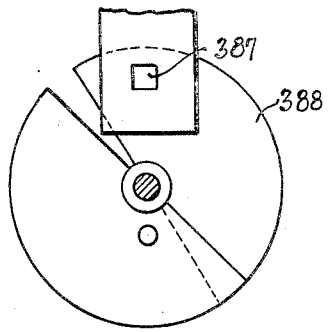
Figure 15 is an elevation taken along line 15—15 in Figure 13 showing the conventional shutter mechanism.

Referring more specifically to the drawings, and especially to Figures 1 and 2, the numeral 10 denotes the framework of an ordinary typewriter having platen 11 and type bar 12. Link 13 is pivoted in the typewriter and said link is also pivoted to a key bar 14. Key bar 14 is pivoted as at 15 to the framework of the typewriter and has a projection 17 extending downwardly therefrom which contacts a contact bar 18 pivoted as at 19. There is a contact bar 18 for each key bar. Tension spring 16 normally holds its associated key bar 14 in the position shown in Figure 2, whereas the spring 20 normally holds the contact bar 18 in contact with projection 17. A suitable board 21 of suitable insulating material is mounted adjacent notched contact bars 18 and normally supports a plurality of wires namely 22, 23, 24, 25, 26, 27, 28, 29, 30, and 245. Board 21 extends transversely of the typewriter for the width of the space occupied by the key bars. Since each notched bar 18 has a wire 31 connected thereto for supplying current to the bar, it is evident that when a key bar 14 is pressed downwardly in Figure 2, that the surface of the bar 18 will contact a plurality of the wires 22 to 30 inclusive and wire 245. In the present instance the wires 22, 23, 26, 28, 29, 30 and 245 will be contacted since notches 18a and 18b are cut out to produce a combination. In each of the bars 18 which are operated by a key bar 14, the notches 18a or 18b will be placed in a different position so that a different selection of wires 22 to 30 will be made. Each wire 31 is connected to a suitable battery 32 which battery is grounded as at 33.

In Figure 1 the notched contact bars 18 are shown graphically in the form of switches but it is evident that any or all of the switches may be operated at one time in order to obtain the proper combination for the code, depending upon the location of the notches in bar 18. The wires 22 to 30 inclusive are connected to suitable brushes 34 to 41 inclusive which brushes contact suitable brush rings 9a on the coding arm 9. This coding arm has secured to its upper forked end (see Figure 4) a plurality of solenoids 50 to 57 inclusive, which are connected to brushes 34 to 41 respectively by suitable wires 42 to 49 inclusive. The upper forked portion of coding arm 9 is adapted to straddle a cylindrical member 59 in which is slidably mounted a plurality of pins, said pins being located circumferentially on four different levels. In the present instance, the rows are indicated by reference characters 60, 61, 62 and 63 (Figs. 4 and 7). The cylindrical member 59 is normally charged with current coming from battery 65 through wire 66. This battery 65 is grounded as at 67.

Let us assume that the key bar 14 is depressed and current is furnished to a selected number of conducting members 22 to 30. The type bar 12 will print the character on the paper for proofing purposes and at the same time a selected number of the solenoids 50 to 57 will be actuated. If the bar 18 is so notched that only the solenoid 50 will be actuated, then the pin 60 will be pushed to the position shown in Figure 4. Likewise if only the solenoid 55 is energized, the pin 61 will be pushed in the opposite direction, and if the solenoids 52 and 56, for example, are simultaneously operated the pins will be pushed to a neutral position as indicated by the position of the pins 62 and 63. The solenoids 50 to 57 are of the conventional plunger type in which the ends of their plungers, disposed next to the pins 60 and 63, are of non-magnetic material.

By having four different rows of pins and each pin being capable of being placed in three different positions, it is evident that eighty-one different combinations can be produced. It is possible to obtain these eighty-one different combinations since the combinations possible in an arrangement of this kind will be the number of positions assumed by a pin, which is three, raised to the power of the number of rows of pins, that is, mathematically, three raised to the fourth power which is eighty-one. Cylinder 59 has a plurality of radially disposed sets of pins 60 to 63 inclusive, each set representing a possible combination, which combination is de-coded to serve a final operation. The lower portion of the coding arm 9 is rotatably mounted in a frame 68 and has fixedly secured on the lower end thereof a suitable pinion 69 which meshes with an idler pinion 70 having integral therewith a ratchet 71. Pinion 70 and ratchet 71 are rotatably mounted on pin 72 and the ratchet 71 has a dog 74 engaged thereon, which dog is pivoted on the right-hand end lever 73 (Figs. 4 and 6). This lever is also rotatably mounted on stud or pin 72 and is normally held in the position shown in Figure 6 by means of a tension spring 75. A magnet 76 is provided for rotating the lever 73 in a clockwise position, whereas, the tension spring 75 operates the lever in a counter-clockwise position to cause the ratchet 71, gear 70 and pinion 69 to be rotated. The magnet 76 is energized by the wire 30 (Figures 1 and 3), each time a type bar is actuated to produce a coded function. A suitable ground 77 is provided for magnet 76.

As has been previously stated, the lever 73 (Fig. 6) is operated by magnet 76 each time a combination of solenoids 50 to 57 is operated to set up a coded combination. When these solenoids are de-energized at the time the key bar 14 is released, the magnet 76 will simultaneously be de-energized and the spring 75 will rotate the ratchet 71 and its associated parts to cause the coding arm 9 to be rotated to the next position ready for the next set of pins 60 to 65 to be located. Each of the solenoids 50 to 57 are grounded as at 79. After the arm 9 has successively moved around the cylinder 59 to set up a plurality of combinations for operation in a line of composition, a de-coding arm is operated to use the recording in a functional manner which will be presently described. The de-coding arm 80 of insulating material has a forked lower end in which is mounted contact brushes 82 to 89 inclusive, so mounted as to contact the pins such as 60 to 63 which are pushed in an off-center position, that is, in a position as occupied by pins 60 or 61 located in the right-hand portion of Figure 4. Immediately upon contact of any of these pins by the brushes 82 to 89 the current is transferred to certain ones of brushes 105 to 112 inclusive through wires 95 to 102 inclusive, by means of rings such as 80a mounted on the vertical portion of de-coding arm 80. It is evident that if the pins are in a position as shown in the lower portion of the cylindrical member 59, that is, in the position of pins 62 and 63, no contacts will be made; consequently, no current will be transferred to their respective brushes. The brushes 105 to 112 inclusive are connected to magnets 125 to 132 inclusive by means of wires 115 to 122 inclusive.

Each of these magnets has a suitable ground 135. When the current has been conducted to a selected number of the magnets 125 to 132 inclusive, certain switches will be operated to produce a function to be later described. The decoding arm 80 has its upper end rotatably mounted in frame 68. Fixedly secured on arm 80 immediately below the frame is a gear 145 which meshes with another gear 146, said gear having integral therewith a suitable ratchet 147. The gear 146 and ratchet 147 are rotatably mounted upon pin 148 and this pin also has mounted for oscillation thereon an arm 149. The right-hand end of arm 149 has a dog 150 normally engaging the teeth in ratchet 147 and the left-hand end of said arm contacts cam 151 which is fixedly mounted on shaft 152.

The cam 151 is driven from a suitable source of power at a speed equivalent to the normal speed of the operator so that the dog 150 and ratchet 147 will be operated to advance the decoding arm 80 successively at the same normal speed. A tension spring 154 is connected intermediate to the ends of arm 149 to normally hold the longer end of this arm in contact with the cam 151. When it is desired to render the ratchet mechanism 147 and its associated gears 145 and 146 inoperable to stop the advancement of the de-coding arm 80, a pivoted latch 156 is provided which is pivoted as at 157 to bracket 158. This latch has a projection 159 which is adapted to project behind the arm 149 in Figure 4, when this arm is moved towards the observer in Figure 4 and holds the arm away from the cam 151. When, in this position, the cam 151 can continue to rotate at its normal speed but the de-coding arm 80 will remain stationary.

The latch lever 156 is operated in a counter-clockwise manner in Figure 4 to cause the projection 159 to extend behind the arm 149. This is accomplished by means of a suitable magnet 160 having a ground 161 and receiving its current through a suitable wire 162, said wire 162 being connected to a distributor point 165 which will be presently described.

In order to release the lever 156 to allow arm 149 to contact the cam and be operated thereby another magnet 166 is provided having a ground 167 and receiving its current through a wire 168, which wire is connected to a suitable switch 169 near the key board for manual operation. This switch may be in the same form as a key bar having a single contact point for contacting a source of current. In regular line printing where equal lengths of lines are desired, it is a well known fact that the lines have to be first set up and then justification added between each word space before the actual line can be produced correctly. The line must be coded or set up before the amount of justification can be determined. For example, the justification is equal to the remainder of unused line divided by the number of word spaces in that line. In the justifier which will be later described, means have been provided whereby this justification can be determined and set up in code before the de-coding system is put into operation. Then, at a subsequent time this amount can be used with its respectively coded line of composition.

Figure 9 shows a scheme of a justifier system used.

The scheme is simply a mechanical representation of a simple geometrical principle.

In similar triangles similar sides are proportionate; if S represented a value equivalent to the number of word spaces in the line of composition and R represented the value of the remainder of the line unused, and U is a unit or constant distance, then J would be a representation of the amount necessary to add to each word space in order to use up the amount of unused line. Likewise, taking a second case, as shown by J', R', S', and U'; J' and J would be proportionate values since U and U' are made equal.

In Figure 8 a shaft 175 is shown having its ends mounted for oscillation in brackets 176 and 177, and fixedly secured to the intermediate portion of said shaft is a bar 178. The right-hand end of this bar has a channel 179 cut therein in which is adapted to rest the lower end of a pin 180, the pin 180 being slidably mounted for vertical movement in the right-hand end of rack bar 181 and being normally forced downwardly against compression spring 182, by bar 183, thereby slidably confining the pin 180 between the bars 178 and 183.

The bar 183 has pins 184 and 185 projecting upwardly therefrom, which pins are slidably confined in rigid brackets 186 and 187 and also being normally pushed upwardly by compression springs 188 and 189. A cam 190 normally presses against the upper side of the bar 183, said cam being mounted on a shaft 191. This shaft 191 has a handle 192 secured on the other end thereof which is manually operated when it is desired to press the bar 183 downwardly to cause the pin 180 to slide in the end of rack bar 181 and tilt the right-hand end of bar 178 downwardly which, in turn will determine the justification; but this operation of the cam 190 does not take place except where the line is to be justified.

In normal operation at the beginning of the writing of a line on the typewriter, the pin 180 is disposed directly over the shaft 175 and in the channel 179. For every word space occurring in the composition, that is, when the space bar is operated on the typewriter, the rack 181 and its associated parts are moved a unit distance to the right; consequently, the distance that the pin 180 maintains with respect to the shaft 175 represents a magnitude equivalent to the number of word spaces in the line of composition. The rack member 181 is slidably mounted in rigid bracket 195 in such a manner that longitudinal movement of the rack can be effected only. A tension spring 196 is used to return the rack bar 181 and its associated parts to normal position after the justification has been effected. The rack 181 has meshing therewith a pinion 197 which pinion is secured on shaft 198 rotatably mounted in a bearing extending from bracket 195. Shaft 198 also has fixedly secured thereon a ratchet 199 and has loosely mounted thereon an arm 200 adjacent said ratchet. Pawl 201 normally engages the teeth of the ratchet and is held in normal position by means of tension spring 203. The lower portion of lever 200 has springs 204 and 205 secured to opposed sides thereof which have their other ends secured to bracket 206. The springs 204 and 205 normally hold the lever 200 in the position shown in Figure 8. A magnet 207, having a ground 208, is secured to the bracket 206 and is located in such position as to attract the lower end of arm 200 when the magnet is energized.

The magnet 207 receives its current through the wire 209, which wire is connected to one side of a switch 210 operated by the space bar of the typewriter. When the space bar is operated the magnet 207 will be energized thereby causing the lever 200 to rotate in a clockwise position to advance the ratchet 199 and pinion 197, which, in turn, will drive the rack bar 181 a unit distance to the right in Figure 8.

Another magnet 213, having a ground 214, is also secured to bracket 206 and located on the opposed side of the lever arm 200 from that of magnet 207. This magnet receives its current through lead wire 215 which is connected to one side of a switch 217, said switch 217 being operated by a clearing button on the key board of the typewriter. When the clearing button on the typewriter key board is manually operated the switch 217 is closed, thereby furnishing current to energize the magnet 213. When this is done, the lever 200 will be rotated in a counter-clockwise manner (Fig. 8) thereby throwing the right-hand end of the pawl 201 against cam surface 218. This will cause the pawl to become disengaged from the ratchet teeth in ratchet 199 to allow the spring 196 to return the rack bar 181 to normal position, which position will cause the pin 180 to be located at the axis of rotation shaft 175. It should be noted that an escapement dog 220 also engages ratchet 199 and is held normally in engagement by means of spring 221. This dog is disengaged simultaneously with dog 201 by means of magnet 222 which has a ground 223 and receives its current from wire 215 through wire 224.

The means for operating the magnitude bar for the representation for the number of spaces for the line of composition of word spaces has been described and now the subtracting means will be explained, that is the means for indicating the amount of unused line in a line of composition on the magnitude bar 178. The bar 178 has a second channel 225 cut therein, into which fits the lower end of pin 226, said pin 226 being slidably mounted for vertical movement in the right-hand end of rack bar 227. This rack bar is slidably mounted in frame 195 for longitudinal movement only. When a line is begun on the typewriter and code is being set up for the line, the lower end of pin 226 is disposed near the left-hand end of channel 225 and the distance along the channel from the pin to the axis of shaft 175 represents the total length of the line of composition including justification. Each time a code character representing a space or character is set up, the rack bar 227 and pin 226 are moved to the right a representative distance according to the width of the letter or space.

A tension spring 228 has one end thereof connected to the right-hand end of rack bar 227 and its other end connected to frame 195 for normally returning the rack to its normal position. A pinion 229 engages the rack 227, said pinion being fixedly secured on shaft 230, which, in turn, is rotatably mounted in a bearing extending from frame 195. The shaft 230 also has fixedly secured thereon a ratchet 231, whose teeth are normally engaged by a pawl 232, said pawl being pivotally secured to lever 233. This pawl 232 is held in mesh with the ratchet 231 by means of spring 235.

The lever 233 is loosely mounted around the rod 230 and has integral with the upper end thereof a projection 236 which normally slides in circumferential groove 237. Communicating with this groove is a plurality of slots 238 in each of which are mounted gates 239 only one of which is shown. Each of these gates has a hole or slot in the end thereof in which the end of the lever 240 is freely mounted. This lever is pivoted as at 241 and has a spring 242 connected to the lower end thereof for normally holding the gate open. Although only five gates are shown in Figure 8, there are actually as many gates as there are different widths of characters or spaces. The lever 240 is operated by a magnet 243 and receives its impulses through wire 245 which is connected by all of the key bars representing a letter space or character having equal space values. That is, a switch 246 will be provided for each set of key bars representing characters having the same space value. The width of the space or character will be represented by the distance that the arm 233 and its associated projection 236 travels in the channel or groove 237. If it is a relatively narrow letter then one of the gates nearer the position that the lever 233 occupies in Figure 8 will be operated to limit the clockwise movement of the lever. Of course, this limitation is effected by means of the projection 236 striking the portion of the gate 239 which happens to be disposed across the channel or groove 237. I have shown only one gate and the operating means therefor, but the other slots each have a similar gate and operating means. The corresponding rotation of lever 233 will be transferred to the shaft 230 and thence to the rack bar 227 to cause the pin 226 to travel towards the right in Figure 8.

This lever 233 is oscillated against the tension of spring 248 by means of a suitable solenoid 250 having a ground 251 and receiving its current through a suitable wire 252, said wire 252 being tapped off of wire 245 which has the other end thereof connected to a switch 246.

The plunger 254 of solenoid 250 normally engages the back side of the lever 233 and when the solenoid is energized the pin moves to the right to cause the lever to be rotated in the same manner. It should be noted that each time one of the magnets 243 is energized to operate a gate 239 the solenoid 250 is simultaneously energized since the wire 252 leading therefrom is tapped off wire 245 which supplies the current to magnet 243. It is, therefore, seen that the solenoid 250 is energized to operate the arm 233 when any of the magnets 243 are energized to close a gate. A release magnet 260 having a ground 261 receives its current through wire 262 which is tapped off of wire 215.

Disposed near the magnet 260 is a release arm 263 which is pivoted on shaft 230 and has a pointed end 263a on the upper side thereof which, when rotated, is adapted to wedge beneath the pawl 232 to lift the same out from engagement with ratchet 231 to allow the spring 228 to return the rack and its associated parts to a normal position. This magnet 260 is energized simultaneously with the magnet 213, previously described, so that all parts of this mechanism in Figure 8 can be returned to normal position for the beginning of a new line.

An escapement dog 277 also is held normally in engagement with ratchet 231 by means of tension spring 277a. This dog is operated simultaneously with release arm 263 by means of magnet 278, having ground 278a, said magnet receiving its current from wire 215 through wire 279.

Applying the structure shown in Figure 8, to the schematic diagram in Figure 9, the distance R is represented in Figure 8 by the horizontal distance between the lower edge of the pin 226 and the axis of the shaft 175 along the channelway 225. This, as has been previously stated, denotes the remainder of the unused line. The distance S is represented in Figure 8 by the distance between the pin 180 and the axis of shaft 175 along the channel 179, and represents the magnitude of the number of word spaces. When the line has been completed and it is desired to determine the justification the cam 190 is operated to push the pin 180 downwardly which distance is constant and is represented by the distance U. This distance is determined by the rise of the cam 190; therefore, the distance that the pin 226 will be moved upwardly will be represented by J in the diagram, which is the justification. The justification is always equal to the remainder of the line unused divided by the word spaces and since the vertical movement J of the pin 180 is mathematically equivalent of the unit distance U multiplied by the remainder and divided by the number of word spaces the pin distance 226 will represent the unit of the justification necessary to be added to each word space in order to fill out the line. That is:

$$\frac{J}{U} = \frac{R}{S}$$

Therefore $$J = \frac{U \times R}{S}$$

This vertical movement represented by the letter J will be transmitted to a mechanism to be presently described for use in a delayed manner. Once this value has been set up, it will be used at the end of each word in the form of justification.

The upper end of pin 226 (see Figure 10) normally contacts the lower side of a disk 265 which is fixed on the lower end of vertically disposed shaft 266 rotatably mounted in framework 267. Secured to the upper end of shaft 266 is an arm 268, said arm contacting a free body 269, which is also slidably mounted for vertical movement in framework 267. A pin 270 projects from the side of free body 269 for limiting the downward movement of this body and a spring 271 normally holds this body in lowered position, that is, in a position shown in the right-hand central portion of Figure 10.

When the justification is set up, represented by the distance J, the pin 226 is moved upwardly by bar 178, the shaft 266 is likewise moved upwardly, which, in turn, will move the pin or free body 269 upwardly the same amount. In this upward position the pin or free body 269 will assume a position shown in the left-hand central portion of Figure 10 and here the pin is held in a fixed position for delayed use, that is, for use at the end of each word space that the justification has been provided for.

The means for holding the free body 269 in the raised position comprises a lug 272 slidably mounted in framework 267, which lug has a beveled surface 273 on the right-hand end thereof making an angle with the vertical of less than forty-five degrees. The pin 275 is also slidably mounted in framework 267 and has its lower end secured to an open lug 274.

A tension spring 276 normally forces the pin 275 upwardly at all times in contact with the cam surface 273. It should also be noted that at the point where the pin or lug 272 contacts the free body 269 that the free body is also slightly tapered which will prevent the free body from escaping upwardly, thereby holding the free body in a rigid position. The means for unlocking or releasing the free body 269 after the justification has been used is done by the following mechanism.

It will be noted that the open lug 274 has one end of an extension 280 extending therein, said extension being slidably keyed on the shaft 266 to prevent relative rotation between the two. A keyway 281 is provided in the shaft 266 with a projection from the hub of extension 280 extending therein. The lower end of hub 281 has a circumferential groove therein into which roller 282 is adapted to fit. This roller is mounted on one end of a lever 283 pivoted as at 284 to the framework and another roller is mounted on the other end of the lever for normally contacting cam 285, which is fixedly mounted on shaft 191. A compression spring 286 is mounted around shaft 266 and disposed between the hub of extension 280 and the framework 267 to normally push the extension upwardly and to also hold the roller in the right-hand end of lever 283 in contact with cam 285 at all times. When it is desired to release a free body 269 the shaft 191 is rotated to cause the high side of cam 285 to move beneath the right-hand end of lever 283 which, in turn, will cause the member 280 to be pulled downwardly. This movement will pull the pin 275 downwardly and allow the free body 269 to also move downwardly to its normal position under the force of spring 271.

Figure 12:
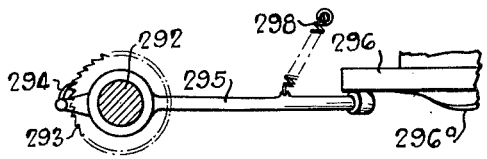
Figure 12 is a sectional plan view taken along line 12—12 in Figure 10.

A plurality of free bodies such as 269 are concentrically mounted in the framework 267 and are operated in identically the same manner as has been previously described. The purpose for providing a plurality is to provide a justification for several lines before those lines are decoded. For example, if there is a long line of composition being decoded, and several short succeeding lines, by providing a plurality of free bodies and justification means it will not be necessary for the operator to wait until the long line has been decoded to re-use the same coding member after a second line has been completed by the operator before the operator proceeds to a third line. (Figure 10.) The members 268 and 280 normally cooperate at the same time with a free body 269 and its locking means. In order to locate or to re-position these members 268 and 280 with relation to the successive free bodies for producing a justification and also for releasing the same, the following means are provided. A gear 290 is fixedly secured on shaft 266 and meshes with a larger gear 291 which is wider than gear 290 to allow a certain amount of relative vertical movement. This gear 291 is rotatably mounted as at 292 and has integral therewith a ratchet 293 whose teeth are normally engaged by a pawl 294. This pawl is secured on one end of a lever 295 loosely mounted around pin 292. The right-hand end of lever 295 contacts side cam 296 (see Figures 10 and 12) which has a projection 296a. This cam is also fixedly secured on shaft 191.

A tension spring 298 normally holds the free end of lever 295 in contact with this cam at all times and when the cam is rotated so as to cause the projection 296a to ride beneath the end of lever 295 it is evident that the ratchet 293 will be advanced accordingly. This movement of ratchet 293 will be transferred through gears 291, 290 and thereby cause the shaft 266 to rotate the members 268 and 280 to the succeeding free body 269. At the end of each line and prior to justification, the shaft 191 is given one complete rotation by means of handle 192. (Figure 8). While the free body is in clamped position as in the position of the free body 269 in the left-hand central portion of Figure 10, the cam 285 will first ride beneath the right-hand end of lever 283 and release the free body to allow it to return to a position shown in the right-hand central portion of Figure 10.

Immediately when the high side of cam 285 rides beneath the lever 283 to effect this release the high side of cam 190 contacts the bar 183 to produce a justification. The cam 190 is of sufficient length so that it will retain this justification or hold the pin 226 in raised position until a release by the cam 285 can be completely effected, so that the free body 269 will be locked in that position. Then upon further rotation the cam 190 will pass off of the bar 183 after which cam 296 will move beneath the lever 295 which operates the ratchet mechanism to advance the members 268 and 280 to the next successive free body and its locking means.

Referring to Figure 1 it is seen that the magnets 125 and 129 actuate a switch 300 which is supplied with current from wire 301, this wire being connected to a suitable source of electrical energy such as battery 302 which battery is grounded as at 303.

A commutator 305 is installed in the line 301 which will provide current to the line only after the proper routine switches of magnets 125 to 132 have been thrown into operation by their respective magnets. With this compound routing system it is possible to furnish electrical energy or current to eighty-one different points, since there are four sets of switches and each switch in each set can be routed to three different points. In other words, the routing system is used to effect a decoding by distributing a source of energy to a number of points by means of a minimum number of controls. The switch 300 furnishes current to wires 306, 307 and 308, although in its present position the switch is shown connected to wire 306. These wires are connected to switches 309, 310 and 311 respectively which are operated simultaneouly with switch 300 by the magnet 130 or 126. These magnets operate the bar 312 to which all of these switches are pivotally connected. The switches 309, 310 and 311 each furnish current to three other wires such as 313, 314, 315 and here the switch 309 is shown contacting wire 313. The current flows through wires 313, 314 and 315 to switches 316, 317 and 318, said switches being operated by magnets 127 and 131 through the bar 319 to which the switches are connected. Each of these switches 316, 317 and 318 also furnish current to three other wires such as 320, 321 and 322. In the present instance the switch 316 is furnishing current to wire 320, said wire 320 being connected to a switch 323 and the wires 321 and 322 being connected to switches 324 and 325 which switches are operated by magnets 128 and 132 through the bar 326 to which the switches are pivotally secured. The switches 323, 324, and 325 each furnish current to three other wires which in turn furnish power for the various operations and controls necessary in the production of the final line.

If none of the magnets 125 to 132 are actuated then the switch 300 will be connected to wire 307 and likewise, the switch 310 will be connected to wire 330 from whence the current will flow directly through switch 331, wire 332 switch 333 to distributing point 334 for final use. However, in this position it should be noted that this will be the only line which is energized but when some of the magnets are energized such as 129 and 126 as shown in the drawings, the current will follow a path as follows: the energy in the particular case shown in Figure 1 will flow from the battery 302 through wire 301, commutator 305, switch 300, wire 306, switch 309, wire 313, switch 316, wire 320, switch 323 to distributor point 327 for final use.

By operating various combinations of the magnets 125 to 132, it is apparent that eighty-one different distributor points can be energized individually. For example, if it is desired to use a distributor point such as 165 to operate a lever 156 (Figures 1 and 4) to lock the bar 149 so that the decoding will not continue, the current will be furnished to the magnet 160 through wire 162, from point 165, which is energized by certain combinations set up by certain pins 60 to 63 in the coding apparatus.

It is thus seen that the code for a function can be set up by actuating the combination of pins 60 to 63 inclusive for delayed use at a desired time and at the desired point in the line of composition.

In order to operate the projector units of this mechanism shown in Figure 4 so that a character will be projected upon a suitable mirror from a magazine and then projected or reflected from this mirror through a lens system and upon a sensitized film or plate, a wire 340 is led off from one of the distributing points such as 339 (Fig. 1A) and this wire is connected to a suitable solenoid 341 grounded as at 342.

The solenoid 341 operates a plunger 344 which has its end slidably mounted in a plate 343, said plunger 344 being held with its upper end normally flush with the top of the plate by suitable means such as a tension spring 345. When this plunger or limiting button 344 is in an operative position, that is, when the solenoid is energized the upper end projects above the top surface of plate 343 it normally limits the counter-clockwise motion of lever 346 (Figure 25). This lever 346 is fixedly connected to a vertically disposed shaft 347 which has a framework 348 secured thereto, in which a horizontal shaft 349 is rotatably mounted.

Secured on shaft 349 is a mirror 350. Shaft 347 is actuated by the swinging motion of bell crank lever 355 which is held in the position shown in Figure 25 against a plunger 344 by means of a tension spring 356. This lever 355 is operated by cam 357 which is turned at the same constant speed as shaft 152 for operating the decoding arm shown in Figures 4 and 5.

When the cam comes into contact with the bell crank 355 and returns the same to normal position the lever 346 rides over the beveled top of latch 360 which is normally in the position shown in Figures 25 and 26 and after it rides over this latch it is prevented from being operated until the magnet 361 is energized to effect a release. Tension spring 359 holds latch 360 in upward position to effect the latching. The magnet 361 is energized through wire 363 which is tapped off of wire 364, said wire 364 receiving its current from a distribution point 365. Leading from the point 365 is another wire 366 which is contacting the commutator 305.

When the bell crank 355 is actuated after one of the solenoids 341 have placed a stop pin 344 in the desired position in plate 343 the shaft 347 and the mirror 350 will be rotated about its vertical axis in order to position the mirror so that a character on the magazine film 380 may be projected onto the mirror 350 by suitable means such as light bulbs 381 which receive current from battery 379 (Figure 1A). When the character is projected onto the mirror its image is reflected through lenses 382 and 383 onto a sensitized film (see Figures 28 and 29).

The means for obtaining the adjustment of mirror 350 about the shaft 349 is essentially the same as the means just described for obtaining vertical adjustment. The arm 386 has a forked end which is pivoted to the shaft 385 which supports the mirror 350 and the free end thereof is adapted to slide in close proximity to a plate 389 having a plurality of stop pins 390 normally mounted therein, each pin being actuated by a solenoid such as 391, said pin and solenoid being identical in structure to solenoid 341 and its associated pin 344. Likewise, a latch 392 having associated therewith a magnet 393 similar to latch 360 and magnet 361, is associated with plate 389 and serves to latch the lever arm 394 to normal position when the arm 394 is lowered to neutral position by means of cam 395. This cam 395 rotates at the same speed as cam 357 and actuates the arm 394 simultaneously with the lever arm 346. The arm 394 is normally held against a button or stop pin 390 by suitable means such as a tension spring 396. The magnet 393 receives its power from wires 364 through magnet 361, both of these magnets being in series and grounded as at 367.

Likewise solenoid 391 is energized from the same source and at the same time that solenoid 341 is energized through wire 340.

Figure 28:
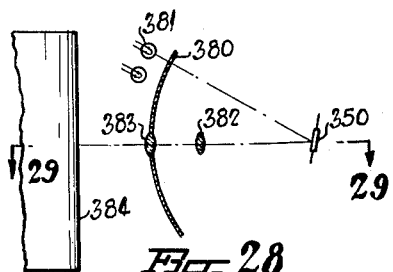
Figure 28 is a diagrammatic view showing the path of light as it is projected through a film onto a mirror and then reflected from the mirror back through suitable lenses onto a sensitized film.
Figure 29:
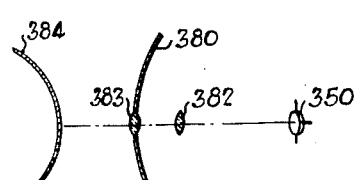
Figure 29 is a sectional plan diagrammatic view taken along line 29—29 in Figure 28.

It is thus seen that rotation of the mirror 350 about its horizontal and vertical axis can be obtained to thereby scan all portions of the film magazine 380 in order to pick a letter or character therefrom and reflect it through the lenses 382, 383 and onto film 384 (Figs. 24, 28 and 29). Film magazine 380 is shown as being in the form of a segment of a sphere with all parts thereon equidistant from mirror 350. When a character is picked off of the member 380 and directed onto film 384 it passes through window 387 and the conventional rotating shutter 388 gives the projection the proper time of exposure. This shutter is turned at the same speed as the decoding time per operation, or at the same speed as shaft 152.

The film 384 is secured on a vertically disposed platen 398 (Figure 13), said platen being slidably mounted for vertical movement on shaft 399 since it has a projection in the hub thereof projecting into key way 400. The hub portions of platen 385 are rotatably mounted in U-shaped bracket 405 which is slidably mounted for vertical movement in frame 406. The U-shaped rack member 405 has teeth therein which are engaged by a pinion 407 which has integral therewith ratchet 408. This ratchet is normally engaged by a pawl 409 secured on lever 410, said lever having one of its ends loosely mounted on shaft 411 upon which the pinion 407 and ratchet 408 are mounted. The lever 410 has a roller 414 which is adapted to be contacted at times by cam 415 which turns at the constant de-coding speed.

When the cam operates it returns the lever 410 to its normal position as shown in Figure 13 against the tension of spring 416, where the lever is locked in position by latch 419 having tension spring 420. This latch is operated by a magnet 421 grounded as at 421a (Figs. 1A and 19). When it is desired to release the latching mechanism the switch 426 is closed thereby supplying current to this magnet 421 thorugh distributing point 425 and wires 424 and 422. Magnet 421 also receives its current from a coded distributing point 423 so that the magnet can be released directly from the keyboard of the typewriter or from a coded function. Lever 410 has a projection 412 on the end thereof which is adapted to fit into the arcuate groove 427 in frame 428. Suitable pins 429 communicate with this groove and are spaced in such position as to limit the downward travel of arm 410. By pushing in various pins 429 a different movement of the ratchet 408 is obtained and consequently a variable vertical displacement of the film is obtained.

Means have just been described for producing a vertical displacement of the film or for moving the same to a new line position. Now the means for producing circumferential displacement of the film will be described.

Referring to Figures 16, 20, 21, 22 the means for producing this circumferential displacement for character spacing is shown. A cam 435 is fixedly mounted on a shaft 436 which turns at the constant speed of the unit de-coding time, or at the same speed as shaft 152.

This cam has a roller 437 contacting the surface thereof which roller is mounted on one end of a lever 438, said lever 438, in turn, being loosely mounted around shaft 439.

A ratchet 440 is also fixedly mounted on shaft 439 adjacent the lever 438. This ratchet is normally operated by pawl 441 which is held in contact with the teeth of the ratchet by means of spring 442. The right-hand end of lever 438 (Fig. 16) has integral therewith a projection 443 which follows the circumferential groove 444 in arcuate frame 445. Also pivoted in this frame 445 is a plurality of gates 446 which are held in the pathway of projection 443 as it moves in groove 444 by means of magnets 447 against the tension of springs 448. After the magnet 447 is operated to cause one of the latches to be placed in the position shown in Figures 21 and 22, a resilient latch 449 hooks over a free end of a gate 446 and maintains it in this position even after its magnet 447 has been de-energized. While only one magnet 447 is shown it should be borne in mind that there are as many magnets as gates and that the number of gates is determined by the number of spacing variations desired in producing characters of normal spacing. Magnet 447 is connected in series with solenoid 341 and receives its current therefrom by wire 452. The magnet 447 is grounded as at 342. Therefore, the different characters having the same space width will operate the same magnet to cause a selected gate 446 to be operated to limit the clockwise rotation of shaft 439. A wire 455 leads from all of the magnets 447 and is connected to a magnet 456 which in turn is grounded as at 342. When this magnet is energized it operates a stop latch 457 to release the lever 438 and allow it to move from the position shown in Figure 16 under the tension of springs 438a in a clockwise manner until the projection 443 contacts a gate 446 (Figures 22 and 23).

The latch 457 is normally held in secure position by means of tension spring 458 and upon energization of the magnet 456 the latch 457 is operated to effect a release of the lever 438, to allow the rotation to be imparted to shaft 439.

Means have also been provided for releasing one of the free ends of gates 446 after it has served its function as a limiting device. This releasing means is not effected until the projection 443 has contacted the gate 446 and started backwardly, at which time the high side or projection 460 on the side of cam 435 will ride beneath roller 461 on lever 462, said lever 462 having its upper end fixedly secured to a shaft 463. A plate 464 is fixedly secured to this shaft which plate has a resilient hook 449 on the upper end thereof for each of the gates 446. In order to hold the roller 461 in contact with cam 460 at all times the tension spring 465 is provided. It is evident that when the roller rides on the high side of the cam 460 that the shaft 463 will be rotated in a counter-clockwise manner thereby causing the free edge of the plate 464 to move the latches away from the gates 446 to allow the gates to be released. At this time the spring 448 will rotate the latches 446 in a clockwise manner (Fig. 22) until the end thereof will be out of the path of the projection 443 travelling in groove 444.

Figure 18:
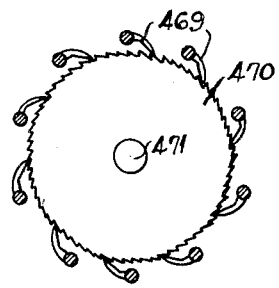
Figure 18 is a sectional view taken along the line 18—18 in Figure 13 showing the ratchet mechanism for advancing the film carriage for the ordinary character spacing.

By referring to Figures 13 and 18, it is seen how this rotation of shaft 439 is used to effect a circumferential displacement of the platen 398 for the normal spacing of characters and word spacing.

Shaft 439 is rotatably mounted in framework 467 and has a disk 468 fixedly secured on the end thereof, said disk having a plurality of spaced pawls 469 contacting the finely divided teeth in ratchet 470. The ratchet 470 is fixedly secured on another shaft 471 which is also rotatably mounted in framework 467. This shaft has a gear 472 fixedly secured thereon, said gear 472 normally meshing with a larger gear 473 which is integral with a slidable collar 474 mounted for vertical sliding movement on shaft 475 by means of keyway 476 in said shaft. The shaft 475 is rotatably mounted in framework 467 and has mounted for vertical sliding movement on the upper end thereof a collar 480 which in turn has integral therewith gear 481. The keyway 482a makes it possible for the collar 480 to have sliding vertical movement and the gear 481 meshes with another gear 482 fixedly secured on platen shaft 399. It is seen that through this chain of gears just described, that the rotation imparted to shaft 439 is transferred to the platen 398 to advance the same a pre-determined amount.

The above described mechanism is used for circumferential displacement of the platen 398 or normal spacing. Where it is necessary to add a small justification between each word in order to have the lines justified, a composite system is used, that is, a second means is connected to the driving means of the platen for adding in this smaller spacing immediately after the normal spacing occurs between words. The means for setting up this justification value has been described in connection with Figures 8 and 10 and this value is represented by the distance that the pin 270 in free body 269 has been set above its normal position.

While the pin 270 and free body 269 are in the position shown in the left-hand central portion of Figure 10, the distance between the pin 270 and the frame 267 represents this value. The free bodies 269 have a cap 269a which serves as a limiting device and which is contacted by projection 490 secured on the lower end of shaft 491. The shaft 491 is slidably mounted in the framework 267 and has a grooved pulley 492 on the upper end thereof into which fits rollers 493 secured to arm 494. This arm is pivoted as at 495 and has a roller mounted in the right-hand end thereof, said roller normally contacting cam 496 fixed on shaft 497. This shaft operates at a constant speed the same as that of the de-coding cam shaft 152 in Figure 4. A spring 498 normally tends to rotate the lever 494 about pivot joint 495. The other end of lever 494 has a segment of a gear 499 which engages a gear 500 fixedly secured on shaft 471. Gear 500 has a plurality of unequally spaced pawls 542 for engaging the ratchet 470. With the arm 490 disposed in the position shown in Figure 10 the rotation of cam 496 will cause the lever 494 to oscillate thereby turning the gear 500 by means of segment 499 an additional amount sufficient to produce the necessary justification. Pawls 469 and 542 are spaced on their mounts so that only one at a time will engage its associated ratchet. This gives a vernier movement for very minute movement of the platen for minute justification. Since the cam normally rotates at a constant speed and it is only desired to add the justification at certain periods, that is, between words, it is necessary to provide a locking means for preventing the oscillation of the lever arm 494 except when justification is desired to be added. This locking means comprises a pivoted hook member 502 pivoted as at 503 to the frame 267.

This hook has a tension spring 504 secured to the lower end thereof for normally holding the hook in the position shown in Figure 10. After the justification has been added and cam 496 rotates from the position shown in Figure 10 the lower left-hand end of lever 494 is caused to fall beneath the hook member 502 and to be latched in position until magnet 505 is energized to release the same. This magnet has a ground 505a and is energized through wire 506 which is connected to one of the distributing points such as 507. Whenever a coding which represents word spacing has routed the energy to point 507 the release magnet 505 will be energized to allow the lever 494 to be released to operate to add the justification.

Figure 11:
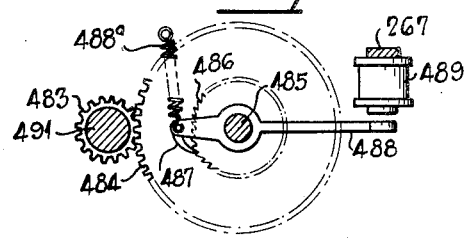
Figure 11 is a sectional plan view taken along the line 11—11 in Figure 10.

In order to re-position arm 490 (Figure 10) to take off a justification value for a new line the following mechanism is provided. Gear 483 is secured on shaft 491 which meshes with a larger gear 484. This gear is rotatably mounted on stud 485 and has integral therewith a ratchet 486, said ratchet being engaged by pawl 487 on lever 488. The lever is freely mounted on stud 485 and is attracted by a magnet 489 to cause gears 483 and 484 to be rotated a predetermined amount and revolve arm 490 in its proper relation to the next successive free body 269. The spring 488a returns the lever 488 and pawl 487 to normal position after magnet 489 has been de-energized. The magnet 489 is grounded as at 489a, and receives its energy from wire 479 leading from coded impulse distributing point 478 (Figure 11).

Collar 474 has additional gears 509, 510 and 521 integral therewith which also cooperate with the gears 511, 512 and 513, (Fig. 13) on shaft 471 to obtain different gear ratios.

The collar 474 is operated by means of a suitable lever 514 pivoted as at 515 and having a nut 516 for securing the lever in adjusted position. Likewise shaft 399 has additional gears 517 and 518 which also cooperate with gears 519 and 520 on collar 480 for effecting a gear ratio which is similar to the arrangement previously described and indicated by reference characters 509, 510 and 521. The handle 522 is pivoted as at 523 and also has a nut 524 for securing the handle in adjusted position after the desired pairs of gears have been thrown into mesh.

Instead of returning the platen 398 to normal position for the beginning of a new line as a typewriter would normally operate, the above-described mechanism works on a continuous principle. In other words, immediately after a line has been completed, means are employed for continuing the cylinder around until it reaches its starting point for the new line.

Fixedly securely on the lower end of shaft 399 is a pinion 527 (Figs. 13 and 14) which meshes with an idler pinion 528, said pinion 528 having integral therewith a smaller pinion 529, which in turn meshes with another pinion 530, said pinion 530 being fixedly secured on the end of stud shaft 531 which shaft is rotatably mounted in framework 467. The lower end of the shaft has a ratchet 532 fixed thereon whose teeth are engaged at times by a pawl 533 secured on the end of lever 534. The lever 534 is loosely mounted on shaft 531. A spring 535 normally holds the pawl in the position shown in Figure 14. A motor 537, having a weight 538 fixed on its shaft, is adapted to make one complete revolution and actuate the lever 534 when the motor is given an impulse.

Figure 14:
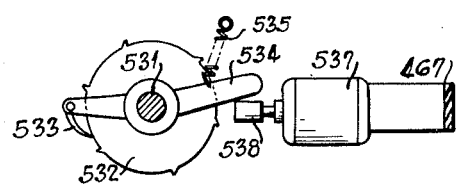
Figure 14 is a sectional plan view taken along line 14—14 in Figure 13.

This motor has a ground 539, is energized through wire 540 leading from coded distributor point 541, and acts at the beginning of a new line. It should be noted that the shaft in this motor only makes one revolution. This revolution causes weight 538 to return the lever 534 to a position where it is capable of revolving the platen 398 three hundred and sixty degrees under the tension of a drive spring 535; however during the normal travel of the platen during the using of a line of composition this ratchet 532 travels its corresponding amount towards the zero point at which time the lever 534 is actuated which will place the dog 533 behind the next tooth in the ratchet wheel so that the spring 535 can complete the revolution of the platen. If the arm 534 should be actuated at the beginning of a line, the dog 533 would rotate ratchet sixty degrees, that is the distance between its teeth. This rotation of sixty degrees will impart three hundred and sixty degrees rotation to the platen. (Fig. 14).

In the drawings and specification there has been set forth a preferred embodiment of the invention, and although specific terms are employed, they are used in a generic and descriptive sense only, and not for purposes of limitation, the scope of the invention being set forth in the appended claims.

I claim:

1. Apparatus for preparing a photographic film of characters for printing, comprising means for transmitting a plurality of impulses for a character, a selector mechanism operable by said impulses to set up a plurality of selections for a line of characters, means for reading the set up characters, while a new line of characters is being set in the selector mechanism, and means operable by the reading of the set up characters for projecting the image of said characters onto said film to produce lines of characters on said film.

2. Apparatus for preparing photographic film having lines of characters for printing thereon, comprising means for transmitting a plurality of electrical impulses for each character, a selector mechanism operable by said impulses, means in said selector mechanism for storing said selections for an entire line, means for reading said stored selections while a new line of selections is being made in said selector, means for holding a sensitized film, means controlled by the reading of said stored selections for projecting onto said film the image of the character called for by a selection in said selector, means for measuring the amount of space occupied by a character in the stored line of characters, means for measuring the number of words in a line of stored charters, means for placing space selections in said selector, means operable by the reading of the stored selections for moving said sensitized film, and means controlled by said combined measuring means for moving the film between words an additional amount above a regular space which is proportional to the length of unfinished space in a line divided by the number of word spaces in a line.

3. Apparatus for photographically composing type characters which comprises a selector mechanism, means for storing in said selector selections for type characters, means for reading said storings, means operable by said reading for projecting the image of a read character onto a sensitized film, means for measuring the amount of space occupied by the stored selections for characters, spaces and the like in a line of selections, means for measuring the number of spaces in a line, means for holding said film, means operable by the reading of a stored space character for moving the means for holding said film a predetermined amount, means for moving the character measuring and word space measuring means, means settable by said moving of the character and word measuring means, and means controlled by the said setting for moving the film a predetermined additional amount between words which is proportional to the length of the unfinished portion of the line divided by the number of word spaces in the line.

4. A selector mechanism for controlling type reproduction means, comprising a circular member, a plurality of sets of pins mounted in the member, an arm mounted for rotation around said circular member and having a forked free end with the forks disposed on each side of said member, a plurality of solenoids mounted in each fork, a typewriter having key bars, means operable by actuation of a key bar for transmitting impulses for energizing some of said solenoids to move some of said pins, a second arm adapted to follow the first arm and having cams thereon, electric impulse conducting means connected to said cams for sending impulses when said cams touch the pins set by the first form, and means controlled by said last named impulses for selecting a type character for reproduction.

5. A typewriter having key bars, a selector mechanism, a sensitized film, justification apparatus, means for moving the film, a member having type characters thereon, a mirror, means for projecting said characters onto said mirror, means operable by the actuation of key bars for setting up selections in said selector mechanism, means for reading the selections in the selector, means operable by the reading of the selections in said selector for causing relative movement between the mirror and the member having the type characters thereon for projecting the image of the selected character onto said film for reproduction, and means for operating the justification apparatus to divide the spaces between the words in a line in proportion to the space remaining in a line of characters.

6. Apparatus for preparing a film having a line of justified characters thereon comprising a selector, means for setting up selections in said selector for an entire line of type characters, means for measuring the space the selected characters will occupy in line printing, means for measuring the number of spaces between words in a line of selected characters, means for reading said line of selections successively, means operable by said reading for projecting the image of said selected characters onto a sensitized film, means for dividing the space remaining in a line by the number of word spaces and spacing the words in the line sufficiently to fill the line on said film, and means for locking said justification setting in position while a line of selections stored in the selector is read by said reading means.

7. Apparatus for preparing a photographic film having thereon justified lines of type characters comprising a selector, means for setting up a line of selections in said selector, means for setting space selections in said selector, means for measuring the space the selected characters will occupy in a line of printed matter, means for counting the word spaces in a line of selections, means for dividing the space remaining in a line of selections by the number of word spaces, a mirror; means for projecting the images of the characters onto said mirror, means for reading a line of selections in said selector, means operable by the reading of a character for moving said mirror to reflect the selected character onto said film, and means operable by a space selection for moving the film an additional amount above a space movement to space the words in a line in accordance with the space remaining in a line divided by the word spaces in the line.

8. Apparatus for producing lines of characters on a sensitized film comprising means for transmitting a plurality of impulses for a character, means operable by said impulses for projecting the image of a character onto said film, means for measuring the space the projected characters will occupy in regular line printing, justifying devices comprising means movable a predetermined amount by the placing of a space character between words, means for dividing the unused space in a line by the number of word spaces, and means controlled by said justifying devices for moving said film between words an additional amount over the regular word space in proportion to the quotient of the remaining space in a line divided by the number of word spaces in a line.

9. Apparatus for producing a photographic film having lines of characters thereon for printing, comprising means for sending a plurality of electrical impulses for a character, a selector having a plurality of parts, there being a set of parts for each character desired to be produced, means operable by a set of impulses for setting a portion of the selector for a character and stepping said means to a new point on the selector, means for reading the settings on said selector while new selections for another line are being set by other sets of impulses, and means operable by the reading of said stored selections for reproducing a character.

10. Apparatus for preparing a photographic film with lines of characters thereon which comprises a typewriter having type bars and key bars for operating the type bars, a selector settable by actuation of the key bars, a character magazine, a mirror, means for reading a line set in the selector, and means operable by successive reading of the selector for successively focusing the mirror to reflect selected characters onto the photographic film.

11. Apparatus for preparing a photographic film having lines of characters thereon for printing, plate making and the like, comprising a typewriter having type bars and key bars, a selector operable by actuation of the key bars for setting up selections for an entire line of characters, a mirror, a member having characters represented thereon, means for successively reading the characters set up in the selector, and means operable by each reading of a stored setting for positioning said mirror to reflect a selected character on said member onto said film for reproducing the image of said character on said film, and means for stepping the film to a position to receive the reflection of a succeeding character.

12. Apparatus for preparing a film having lines of justified type characters thereon comprising a typewriter having type bars and key bars for operating the type bars, means operable by the actuation of a type bar for transmitting a plurality of electrical impulses, a selector mechanism, means operable by the impulses sent by actuation of a plurality of key bars for setting up in the selector a plurality of selections to form a line of type characters, means for holding and moving said film, a member having the desired characters thereon, a mirror mounted for universal movement in a selected place, means for reading the selections in said selector for an approximate line of characters, means for measuring the space occupied by the characters in a line as the selections are set up in the selector, means for counting the space characters set up in the selector, means operable by the reading of a character for moving said mirror to cause the image of one of said characters to be reflected onto said film, means for dividing the space remaining in a line by the number of word spaces in a line of selected characters, and means operable by the reading of a word space setting for moving the film an additional amount above the regular movement imparted by a word spacing character which is proportional to the space remaining in the line divided by the number of word spaces in the line.

13. Apparatus for producing a film having lines of printed characters thereon comprising a rotatable carriage for holding the film, means for projecting the images of type characters onto said film, means for rotating said film upon selection of a character in proportion to the width of the character, means for rotating the film to form spaces between the words in the line, means controlled by the space occupied by the characters in a line and the number of words spaced in a line for rotating the carriage an additional amount above a regular space between words which is proportional to the unused space in a line divided by the number of spaces between the words in the line.

14. Apparatus for preparing a photographic film of characters for printing, comprising means for transmitting a plurality of impulses for a character, a selector mechanism operable by said impulses to set up a plurality of selections for a line of characters, means for reading the set up characters while a new line of characters is being set in the selector mechanism, means operable by the reading of the set up characters for projecting the image of said characters onto said film to produce lines of characters on said film, and means for making a selection in the selector mechanism to stop the reading means when the end of a line of selections has been reached.

15. Apparatus for photographically composing type characters which comprises a selector mechanism, means for storing in said selector selections for type characters, means for reading said storings, means operable by said reading for projecting the image of a read character onto a sensitized film, means for measuring the amount of space occupied by the stored selections for characters, spaces and the like in a line of selections, means for measuring the number of spaces in a line, means for holding said film, means operable by the reading of a stored space character for moving the means for holding said film a predetermined amount, means for moving the character measuring and word space measuring means, means settable by said moving of the character and word measuring means, means controlled by the said setting for moving the film a predetermined additional amount between words which is proportional to the length of the unfinished portion of the line divided by the number of word spaces in the line, and means for making a selection in the selector mechanism to stop the reading means when the end of a line of selections has been reached.

16. A typewriter having key bars, a selector mechanism, a sensitized film, justification apparatus, means for moving the film, a member having type characters thereon, a mirror, means for projecting said characters onto said mirror, means operable by the actuation of key bars for setting up selections in said selector mechanism, means for reading the selections in the selector, means operable by the reading of the selections in said selector for causing relative movement between the mirror and the member having the type characters thereon for projecting the image of the selected character onto said film for reproduction, means for operating the justification apparatus to divide the spaces between the words in a line in proportion to the space remaining in a line of characters, and means for making a selection in the selector mechanism to stop the reading means when the end of a line of selections has been reached.

17. Apparatus for preparing a film having a line of justified characters thereon comprising a selector, means for setting up selections in said selector for an entire line of type characters, means for measuring the space the selected characters will occupy in line printing, means for measuring the number of spaces between words in a line of selected characters, means for reading said line of selections successively, means operable by said reading for projecting the image of said selected characters onto a sensitized film, means for dividing the space remaining in a line by the number of word spaces and spacing the words in the line sufficiently to fill the line on said film, means for locking said justification setting in position while a line of selections stored in the selector is read by said reading means, and means for making a selection in the selector mechanism to stop the reading means when the end of a line of selections has been reached.

18. Apparatus for preparing a photographic film of characters for printing, comprising means for transmitting a plurality of impulses for a character, a selector mechanism operable by said impulses to set up a plurality of selections for a line of characters, means actuated independently of the selecting mechanism for reading the set up characters while a new line of characters is being set in the selector mechanism, means operable by the reading of the set up characters for projecting the image of said characters onto said film to produce lines of characters on said film, and means for varying the size of the image which is projected onto said film.

19. Apparatus for preparing a photographic film having lines of characters thereon for printing, plate making and the like, comprising a typewriter having type bars and key bars, a selector operable by actuation of the key bars for setting up selections for an entire line of characters, a mirror, a member having characters represented thereon, means for successively reading the characters set up in the selector, means operable by each reading of a stored setting for positioning said mirror to reflect a selected character on said member onto said film for reproducing the image of said character on said film, means for stepping the film to a position to receive the reflection of a succeeding character, said last means comprising apparatus settable at will for stepping the film a predetermined distance sufficient to receive the reflected character.

20. Apparatus for preparing a photographic film having lines of characters thereon for printing, plate making and the like, comprising a typewriter having type bars and key bars, a selector operable by actuation of the key bars for setting up selections for an entire line of characters, a member having characters represented thereon, means for successively reading the characters set up in the selector, means operable by each reading of the stored setting for positioning said mirror to reflect a selected character on said member onto said film for reproducing the image of said character on said film, means for stepping the film to a position to receive the reflection of a succeeding character, and means for moving the film to a new line position upon completion of the scanning of a line of selections, regardless of the length of the line.

21. Apparatus for preparing a photographic film having lines of characters thereon for printing, plate making and the like, comprising a typewriter having type bars and key bars, a selector operable by actuation of the key bars for setting up selections for an entire line of characters, a mirror, a member having characters represented thereon, means for successively reading the characters set up in the selector, means operable by each reading of a stored setting for positioning said mirror to reflect a selected character on said member onto said film for reproducing the image of said character on said film, means for stepping the film to a position to receive the reflection of a succeeding character, and means operable by the last setting in a line of selections for stepping the film to new line position.

22. Apparatus for preparing a photographic film having lines of characters thereon for printing, plate making and the like, comprising a typewriter having type bars and key bars, a selector operable by actuation of the key bars for setting up selections for an entire line of characters, a mirror, a member having characters represented thereon, means for successively reading the characters set up in the selector, means operable by each reading of a stored setting for positioning said mirror to reflect a selected character on said member onto said film for reproducing the image of said character on said film, means for stepping the film to a position to receive the reflection of a succeeding character, and means in the selector for stepping the film to the beginning of a new line when the preceding line of any desired length has been read.

23. Apparatus for preparing a photographic film having lines of characters thereon for printing, plate making and the like, comprising a typewriter having type bars and key bars, a selector operable by actuation of the key bars for setting up selections for an entire line of characters, a mirror, a member having characters represented thereon, means for successively reading the characters set up in the selector, means operable by each reading of a stored setting for positioning said mirror to reflect a selected character on said member onto said film for reproducing the image of said character on said film, means for stepping the film to a position to receive the reflection of a succeeding character, and means for adjusting the space between the lines of characters on the film.

24. Apparatus for preparing a film having lines of justified characters thereon which comprises a selector, means for setting up and storing in said selector selections for a line of characters, a plurality of justifying means operable one at a time for measuring the spaces the characters called for in the selector will occur in regular line printing, means for locking one of said justifying means in position when a line of characters has been stored in the selector and shifting to another justifying means, means for reading a line of stored selections in said selector, means for reading the justifications in the justifying means for the stored line and means operable by the reading of a line of selections for projecting the images of the characters called for by the selector onto said film for reproduction.

25. Apparatus for preparing a film having lines of justified characters thereon which comprises a selector, means for setting up and storing in said selector selections for a line of characters, a plurality of justifying means operable one at a time for measuring the space the characters called for in the selector will occupy in regular line printing, means for locking one of said justifying means in position when a line of characters has been stored in the selector and shifting to another justifying means, means for reading a line of stored selections in said selector, means for reading the justifications in the justifying means for the stored line and means operable by the reading of a line of selections for projecting the images of the characters called for by the selector onto said film for reproduction, and means for setting a new line in the selector and setting another justifying means while a stored line of selections is being read.

26. Apparatus for preparing a film having lines of justified characters thereon which comprises a selector, means for setting up and storing in said selector selections for a line of characters, a plurality of justifying means operable one at a time for measuring the space the characters called for in the selector will occupy in regular line printing, means for locking one of said justifying means in position when a line of characters has been stored in the selector and shifted to another justifying means, means for reading a line of stored selections in said selector, means for reading the justifications in the justifying means for the stored line, means operable by the reading of a line of selections for projecting the images of the characters called for by the selector onto said film for reproduction, means for setting a new line in the selector and setting another justifying means while a stored line of selections is being made, and means for unlocking the justifying means for a line of selections upon completion of the reading of the selections for that line.

27. Apparatus for preparing a photographic film of characters for printing, comprising means for transmitting a plurality of impulses for a character, a selector mechanism operable by said impulses to set up a plurality of selections for a line of characters, means for reading the set up characters, while a new line of characters is being set in the selector mechanism, means operable by the reading of the set up characters for projecting the image of said characters onto said film to produce lines of characters on said film, and means for illuminating the character which is being projected onto said film.

28. Apparatus for preparing photographic film having lines of characters for printing thereon, comprising means for transmitting a plurality of electrical impulses for each character, a selector mechanism operable by said impulses, means in said selector mechanism for storing said selections for an entire line, means for reading said stored selections while a new line of selections is being made in said selector, means for holding a sensitized film, means controlled by the reading of said stored selections for projecting onto said film the image of the character called for by a selection in said selector, means for measuring the amount of space occupied by a character in the stored line of characters, means for measuring the number of words in a line of stored characters, means for placing space selections in said selector, means operable by the reading of the stored selections for moving said sensitized film, means controlled by said combined measuring means for moving the film between words an additional amount above a regular space which is proportional to the length of unfinished space in a line divided by the number of word spaces in a line, and means for returning said combined measuring means to initial position preceding the setting of a new line of selections.

29. Apparatus for preparing photographic film having lines of characters for printing thereon, comprising means for transmitting a plurality of electrical impulses for each character, a selector mechanism operable by said impulses, means in said selector mechanism for storing said selections for an entire line, means for reading said stored selections while a new line of selections is being made in said selector, means for holding a sensitized film, means controlled by the reading of said stored selections for projecting onto said film the image of the character called for by a selection in said selector, means for measuring the amount of space occupied by a character in the stored line of characters, means for measuring the number of words in a line of stored characters, means for placing space selections in said selector, means operable by the reading of the stored selections for moving said sensitized film, means controlled by said combined measuring means for moving the film between words an additional amount above a regular space which is proportional to the length of unfinished space in a line divided by the number of word spaces in a line, and means for automatically returning said combined measuring means to initial position preceding the setting of a new line of selections.

30. Apparatus for preparing a photographic film having lines of characters thereon for printing, plate making and the like, comprising a typewriter having type bars and key bars, a selector operable by actuation of the key bars for setting up selections for an entire line of characters, a mirror, a member having characters represented thereon, means for successively reading the characters set up in the selector, means operable by each reading of a stored setting for positioning said mirror to reflect a selected character on said member onto said film for reproducing the image of said character on said film, means for stepping the film to a position to receive the reflection of a succeeding character, and means for determining the size of the image of the reflected character.

31. Apparatus for producing a photographic record of characters comprising a stationary member carrying the characters to be reproduced, a mirror mounted for universal movement, a sensitized surface, means for moving said mirror to focus the mirror on the character to be reproduced to thereby reflect the image of the selected character onto the surface, and means for positioning said photographic record so that the reflected image will strike said surface at the desired location.

32. Apparatus for producing a photographic record of characters comprising means for selecting one at a time the characters to be reproduced, a stationary member carrying the characters to be reproduced, a mirror mounted for universal movement, a sensitized surface, means for moving said mirror to focus the mirror on the character to be reproduced to thereby reflect the image of the selected character onto the surface, and means for positioning said sensitized surface universally in a common plane so that the reflected image will strike said surface at the desired point.

33. Apparatus for producing a photographic record of characters comprising means for selecting, one at a time, the characters to be reproduced, a stationary member carrying the characters to be reproduced, a mirror mounted for universal movement, a sensitized surface, means for moving said mirror to focus the mirror on the character to be reproduced to thereby reflect the image of the selected character onto the surface, and means for positioning said sensitized surface universally in a common plane so that the reflected image will strike said surface at the desired point.

34. Apparatus for reproducing lines of justified characters comprising means for making a record of selections for a line, means for indicating the number of word spaces in a line, means for indicating while the line is being set the amount of space still remaining in a line, a character reproducing machine for reproducing the selected characters on a page, one at a time, and means controlled by said two indicating means for controlling the space between the characters as they are reproduced.

35. Apparatus for preparing a page of printed characters, comprising means for transmitting a plurality of impulses for a character, a selector mechanism operable by said impulses to set up selections for a line of characters, means for reading the set up characters while a new line of characters is being set in the selector mechanism, character reproducing mechanism, means operable by the reading of the set up characters for selectively operating the character reproducing mechanism for reproducing the selected characters one at a time, and means operable by the setting up of the selections for the characters for determining the amount of justification needed in a line of characters, and means controlled by the last named means for varying the word spacing in the reproduced line of characters.

36. A selector mechanism for controlling type reproduction, means comprising a circular member, a plurality of sets of pins mounted in the member, an arm mounted for rotation around said circular member and having a forked free end with the forks disposed on each side of the member, a plurality of movable means mounted in each fork, a typewriter having key bars, means operable by the actuation of a key bar for moving some of said movable means in said forks to move said pins, a second arm adapted to follow the first arm and having cams thereon, work performing instrumentalities operable by said cams and means controlled by the work performing instrumentalities for selecting a type character for reproduction.

37. Apparatus for reproducing pages of characters having lines with justified characters thereon comprising a selector, means for setting up selections in the said selector for an entire line of type characters, means for measuring the space the selected characters will occupy in line printing, means for measuring the number of spaces between the words in a line of selected characters, means for reading said lines of selections successively, a character reproducing machine, means operable by said reading for selectively actuating the character reproducing machine to produce characters one at a time, means for dividing the space remaining in a line by the number of word spaces and spacing the words in the line sufficiently to fill the line reproduced by said character reproducing machine, and means for locking said justification setting in position while a line of selections stored in the selector is read by said reading means to reproduce a line of selected characters one at a time and in justified order.

38. Apparatus for preparing a printed page having thereon justified lines of type characters, comprising a selector, means for setting up a line of selections in said selector, means for setting space selections in said selector, means for measuring the space the selected characters will occupy in a line of printed matter, means for counting the word spaces in a line of selections, means for dividing the space remaining in a line of selections by the number of word spacings, a character reproducing machine, means operable by the selector for actuating the characters in the character reproducing machine one at a time, and means operable by a space selection for spacing the characters as reproduced on said sheet an additional amount above a space movement to space the words in a line in accordance with the space remaining in a line divided by the word spaces in the line.

39. Apparatus for producing lines of characters on a sheet, comprising means for transmitting a plurality of impulses for a character, a character reproducing machine capable of reproducing the characters on the sheet one at a time, means operable by said impulses for reproducing characters one at a time on said sheet, means for measuring the space the selected characters will occupy in regular line printing, justifying devices comprising means movable a predetermined amount by the placing of a space character between words, means for dividing the unused space in a line by the number of word spaces, means controlled by said justifying devices for actuating the character reproducing machine to space the characters as written an additional amount over the regular word space in proportion to the quotient of the remaining space in a line divided by the number of word spaces in a line.

40. Apparatus for preparing a film having lines of justified type characters thereon comprising a typewriter having type bars and key bars for operating the type bars, means operable by the actuation of a type bar for transmitting a plurality of impulses, a selector mechanism, means operable by the impulses sent by actuation of a plurality of key bars for setting up in the selector a plurality of selections to form a line of type characters, means for holding and moving said film, a member having the desired characters thereon, a mirror mounted for universal movement in a selected place, means for reading the selections in said selector for an approximate line of characters, means for measuring the space occupied by the characters in a line as the selections are set up in the selector, means for counting the space characters set up in the selector, means operable by the reading of a character for moving said mirror to cause the image of one of said characters to be reflected onto said film, means for dividing the space remaining in a line by the number of word spaces in a line of selected characters, and means operable by the reading of a word space setting for moving the film an additional amount above the regular movement imparted by a word spacing character which is proportional to the space remaining in the line divided by the number of word spaces in the line.

41. Apparatus for preparing a sheet having lines of justified characters thereon comprising a selector, means for setting up selections in said selector for an entire line of characters, means for measuring the space the selected characters will occupy in line printing, means for measuring the number of spaces between the words in a line of selected characters, means for reading said line of selections successively, a character reproducing machine having a plurality of independently operable character reproducing means therein, means operable by said reading for selectively operating one of said character reproducing means in the character reproducing machine, means for dividing the space remaining in a line by the number of word spaces and spacing the words in a line sufficiently to fill the line on said sheet, means for locking said justification setting in position while a line of selections stored in the selector is read by said reading means, and means for making a selection in the selector mechanism to stop the reading means when the end of a line of selections has been reached.

42. Apparatus for preparing a sheet having lines of justified characters thereon, comprising a selector, means for setting up selections in said selector for an entire line of characters, means for measuring the space the selected characters will occupy in line printing, means for measuring the number of spaces between the words in a line of selected characters, means for reading said line of selections successively, a character reproducing machine having a plurality of independently operable character reproducing means therein, means operable by said reading for selectively operating one of said character reproducing means in the character reproducing machine, means for dividing the space remaining in a line by the number of word spaces and spacing the words in a line sufficiently to fill the line on said sheet, means for locking said justification setting in position while a line of selections stored in the selector is read by said reading means, means for making a selection in the selector mechanism to stop the reading means when the end of a line of selections has been reached, and means for moving the sheet to new line position when a line of characters has been reproduced.

LOUIS A. SPIEVAK.